United States Patent
Hiraoka (10) Patent No.: US 9,644,104 B2
(45) Date of Patent: May 9, 2017

(54) PHOTOPOLYMERIZABLE COMPOSITION, INKJET INK, CARTRIDGE, AND CURED MATTER

(71) Applicant: Takao Hiraoka, Kanagawa (JP)

(72) Inventor: Takao Hiraoka, Kanagawa (JP)

(73) Assignee: RICOH COMPANY, Tokyo (JP)

( * ) Notice: Subject to any disclaimer, the term of this patent is extended or adjusted under 35 U.S.C. 154(b) by 209 days.

(21) Appl. No.: 14/492,208

(22) Filed: Sep. 22, 2014

(65) Prior Publication Data

US 2015/0099819 A1  Apr. 9, 2015

(30) Foreign Application Priority Data

Oct. 4, 2013  (JP) .................................. 2013-208785

(51) Int. Cl.
*C09D 11/101* (2014.01)
*C08F 2/50* (2006.01)
*C09D 11/38* (2014.01)

(52) U.S. Cl.
CPC .............. *C09D 11/101* (2013.01); *C08F 2/50* (2013.01); *C09D 11/38* (2013.01)

(58) Field of Classification Search
CPC .......... C09D 11/101; C09D 11/38; C08F 2/50
See application file for complete search history.

(56) References Cited

U.S. PATENT DOCUMENTS

| 2005/0175925 | A1* | 8/2005 | Johnson | ................... | G03F 7/032 |
| | | | | | 430/280.1 |
| 2006/0187285 | A1* | 8/2006 | Oyanagi | ................ | B41J 11/002 |
| | | | | | 347/100 |
| 2007/0120925 | A1* | 5/2007 | Belelie | ................. | C09D 11/101 |
| | | | | | 347/100 |
| 2010/0113638 | A1* | 5/2010 | Su | ............................. | C08F 2/44 |
| | | | | | 522/39 |
| 2010/0215708 | A1* | 8/2010 | Zumbuehl | ............... | A61L 27/34 |
| | | | | | 424/422 |
| 2012/0147103 | A1 | 6/2012 | Hasegawa et al. | | |
| 2012/0293589 | A1 | 11/2012 | Hiraoka | | |

FOREIGN PATENT DOCUMENTS

| JP | 2004-526820 | 9/2004 |
| JP | 2009-203387 | 9/2009 |
| JP | 2009-263524 | 11/2009 |
| JP | 2012-140593 | 7/2012 |
| JP | 2013-181114 | 9/2013 |
| JP | 2013-256659 | 12/2013 |
| WO | WO02/061001 A1 | 8/2002 |

OTHER PUBLICATIONS

U.S. Appl. No. 14/225,696, filed Mar. 26, 2014.

* cited by examiner

Primary Examiner — Nicole M Buie-Hatcher (74) Attorney, Agent, or Firm — Cooper & Dunham LLP (57) ABSTRACT

A photopolymerizable composition contains diethylene glycol dimethacrylate, b1, b2, and b3, wherein the content of b2 is less than 2.5% by weight, the content of b3 is less than 3% by weight. b1 is 1-[4-(2-hydroxyethoxy)-phenyl]-2-hydroxy-2-methyl-1-propane-1-on, b2 is 2-hydroxy-1-{4-[4-(2-hydroxy-2-methyl-propionyl)benzyl]phenyl}-2-methyl-1-propane-1-on, and b3 is oligo{2-hydroxy-2-methyl-1-[4-(1-methylvinyl)phenyl]propanone}.

12 Claims, 1 Drawing Sheet

PHOTOPOLYMERIZABLE COMPOSITION, INKJET INK, CARTRIDGE, AND CURED MATTER

CROSS-REFERENCE TO RELATED APPLICATION

This patent application is based on and claims priority pursuant to 35 U.S.C. §119 to Japanese Patent Application No. 2013-208785 on Oct. 4, 2013 in the Japan Patent Office, the entire disclosure of which is hereby incorporated by reference herein.

BACKGROUND

Technical Field

The present invention relates to a photopolymerizable composition, inkjet ink, a cartridge containing the ink, and a coated matter.

Background Art

Most of monomers for use in conventional photopolymerizable inkjet ink are toxic. In particular, (meth)acrylic acid esters, which are inexpensive and easily available, usually have high toxicity about skin sensitization potential indicating the degree of allergy upon contact with the skin. So far, this problem has remained unsolved.

These are required to have better robustness of a cured film of ink by ameliorating durability to scratch and low viscosity in order to avoid problems upon ink ejection even when the viscosity of ink is increased by mixing various materials such as pigments and additives.

In addition, when a photopolymerizable composition is used as a paint by brushing, it is possible to use organic solvents. However, such solvents are volatile and easily released into air. For this reason, it is preferable to use it as least as possible taking into account impact on environment and odor. If used as inkjet ink and mixed with an organic solvent having a high volatility, ink in nozzles to eject the ink becomes viscous by volatilization, resulting in adverse impact on ejection of ink, which is not preferable.

To reduce odor, it is good to simply reduce the amount of polymerization initiators. However, this sacrifice curing. That is, it is significantly difficult to obtain a cured matter while reducing smell. Some polymerization initiators produce no or little smell but is hazardous or has no or little solubility. Taking care of them in terms of safety and easiness of handling is furthermore difficult.

SUMMARY

The present invention provides an improved photopolymerizable composition contains diethylene glycol dimethacrylate, b1, b2, and b3, wherein the content of b2 is less than 2.5% by weight, the content of b3 is less than 3% by weight, where b1 is 1-[4-(2-hydroxyethoxy)-phenyl]-2-hydroxy-2-methyl-1-propane-1-on, b2 is 2-hydroxy-1-{4-[4-(2-hydroxy-2-methyl-propionyl)benzyl]phenyl}-2-methyl-1-propane-1-on, and b3 is oligo{2-hydroxy-2-methyl-1-[4-(1-methylvinyl)phenyl]propanone}.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

The present invention is to provide a photopolymerizable composition that significantly reduces smell produced during photocuring and smell remaining in a cured matter immediately after curing and has good curing reaction property and safety.

The present inventor has found that, by adding the following materials of b1, b2, and b3 to a photopolymerizable composition containing diethylene glycol dimethacrylate, it is possible to impart excellent safety and curing property thereto and significantly reduce smell (odor) produced during curing or remaining in a cured matter immediately after curing.

b1: 1-[4-(2-hydroxyethoxy)-phenyl]-2-hydroxy-2-methyl-1-propane-1-on, b2: 2-hydroxy-1-{4-[4-(2-hydroxy-2-methyl-propionyl)benzyl]phenyl}-2-methyl-1-propane-1-on, and b3: oligo{2-hydroxy-2-methyl-1-[4-(1-methylvinyl)phenyl]propanone}.

Thus, the present invention was made.

Embodiments of the present disclosure invention are 1 to 7 below but the present invention is not limited thereto.

1. A photopolymerizable composition containing:
diethylene glycol dimethacrylate;
b1;
b2; and
b3,
wherein the content of b2 is less than 2.5% by weight,
wherein the content of b3 is less than 3% by weight.
b1 is 1-[4-(2-hydroxyethoxy)-phenyl]-2-hydroxy-2-methyl-1-propane-1-on, b2 is 2-hydroxy-1-{4-[4-(2-hydroxy-2-methyl-propionyl)benzyl]phenyl}-2-methyl-1-propane-1-on, and b3 is oligo{2-hydroxy-2-methyl-1-[4-(1-methylvinyl)phenyl]propanone}.

2. The photopolymerizable composition of 1 mentioned above, further containing caprolactone-modified dipentaerythritol hexaacrylate.

3. The photopolymerizable composition of 1 or 2 mentioned above, further containing ethylene oxide-modified trimethylol propane trimethacrylate.

4. The photopolymerizable composition of any one of 1 to 3 mentioned above, further containing polypropylene glycol diacrylate.

5. An inkjet ink containing:
diethylene glycol dimethacrylate;
b1;
b2; and
b3,
wherein the content of b2 is less than 2.5% by weight,
wherein the content of b3 is less than 3% by weight.
b1 is 1-[4-(2-hydroxyethoxy)-phenyl]-2-hydroxy-2-methyl-1-propane-1-on, b2 is 2-hydroxy-1-{4-[4-(2-hydroxy-2-methyl-propionyl)benzyl]phenyl}-2-methyl-1-propane-1-on, and b3 is oligo{2-hydroxy-2-methyl-1-[4-(1-methylvinyl)phenyl]propanone}.

6. A cartridge including
a container to accommodate the inkjet ink of 5 mentioned above.

7. Cured matter manufactured by photopolymerizing the photopolymerizable composition of any one of 1 to 4 mentioned above or the inkjet ink of 5 mentioned above.

The photopolymerizable composition of the present disclosure is described in detail below.

The photophotopolymerizable composition of the present disclosure contains at least diethylene glycol dimethacrylate, b1, b2, and b3, wherein the content of b2 is less than 2.5% by weight, wherein the content of b3 is less than 3% by weight.

b1 is 1-[4-(2-hydroxyethoxy)-phenyl]-2-hydroxy-2-methyl-1-propane-1-on, b2 is 2-hydroxy-1-{4-[4-(2-hydroxy-2-methyl-propionyl)benzyl]phenyl}-2-methyl-1-propane-1-on, and b3 is oligo{2-hydroxy-2-methyl-1-[4-(1-methylvinyl)phenyl]propanone}.

Most photopolymerization initiators for use in polymerizable compositions cause no trouble about skin sensitization problem, which is described later but have reproductive toxicity and aquatic toxicity hazardous to environment.

However, the kinds and the mixing ratio of the polymerization initiators in the present disclosure makes it possible to secure safety sufficiently to obviate the need for displaying a pictogram indicating hazard in The Globally Harmonized System (GHS) of Classification and Labeling of Chemicals derived from the polymerization initiators.

A photopolymerizable composition negative in skin sensitization potential at least satisfies the following (1) or (2):
(1) a compound having a Stimulation Index (SI value) of less than 3, where the Stimulation Index indicates the level of sensitization as measured by a skin sensitization test based on the LLNA (Local Lymph Node Assay) method; and
(2) a compound evaluated as "negative in skin sensitization potential" or "no skin sensitization" in its MSDS (Material Safety Data Sheet).

Regarding the above (1), the compound having the SI value of less than 3 is considered as negative for skin sensitization as described in literatures, for example, "Functional Material" (Kino Zairyou) 2005, September, Vol. 25, No. 9, p. 55. Lower SI values mean lower levels of skin sensitization potential. Accordingly, in the present disclosure, a monomer having a lower SI value is preferably used. The SI value of the monomer used is preferably less than 3, more preferably 2 or lower, and even more preferably 1.6 or lower.

Monomer Component

The photopolymerizable composition of the present disclosure contains diethylene glycol dimethacrylate as monomer component and optional materials such as other monomer components and colorants.

Since diethylene glycol dimethacrylate is free from skin sensitization problems and has a low viscosity, it is excellent as raw material of polymerizable composition usable as inkjet ink. Although diethylene glycol dimethacrylate is a highly safe compound, it has no sufficient curability (polymerizability) so that an addition of a photopolymerization initiator is necessary.

Photopolymerization Initiator

Since b2, 2-hydroxy-1-{4-[4-(2-hydroxy-2-methyl-propionyl)benzyl]phenyl}-2-methyl-1-propane-1-on, has excellent curing property while no or little smell is produced during curing or remains in a cured matter immediately after curing, it is a suitable photopolymerization initiator to reduce smell.

However, it has aquatic toxicity itself and the symbols of "N" and "R50/53" and risk phrase in hazard classification in European Directives (67/548/EEC) are attached to the compound.

In the present disclosure, by setting the amount of b2, 2-hydroxy-1-{4-[4-(2-hydroxy-2-methyl-propionyl)benzyl]phenyl}-2-methyl-1-propane-1-on, less than 2.5% by weight, the statement attached of "R52/53" is more relaxed in European Directives (1999/45/EC) about prescription. This means that, safety is improved sufficiently, thereby obviating the need of displaying a pictogram of hazard in GHS.

The lower limit of the content of b2 is preferably 1.5% by weight or more, depending on the usage or objective of a photopolymerizable composition. When the lower limit is too low, the curing property of a photopolymerizable composition may deteriorate.

Like b2, since b3, oligo{2-hydroxy-2-methyl-1-[4-(1-methylvinyl)phenyl]propanone}, has excellent curing property and no or little smell is produced during curing or remains in a cured matter immediately after curing like b2, it is a suitable photopolymerization initiator to reduce smell.

However, it has reproductive toxicity itself and the statement of "R62" in hazard classification in European Directives (67/548/EEC) is attached thereto.

In the present disclosure, to improve safety, by setting the amount of b3, oligo{2-hydroxy-2-methyl-1-[4-(1-methylvinyl)phenyl]propanone}, less than 5% by weight, displaying a pictogram indicating hazard in European Directives (1999/45/EC) is made unnecessary, and moreover, by setting it less than 3% by weight, displaying a pictogram indicating hazard in GHS is made unnecessary.

The lower limit of the content of b3 is preferably 2.0% by weight or more, depending on the usage or objective of a photopolymerizable composition. When the lower limit is too low, the curing property of a photopolymerizable composition may deteriorate.

Since the two kinds of photopolymerization initiators of b2 and b3 are not enough to obtain sufficient curing property, b1, 1-[4-(2-hydroxyethoxy)-phenyl]-2-hydroxy-2-methyl-1-propane-1-on, is added in the present disclosure.

As described above, b1, 1-[4-(2-hydroxyethoxy)-phenyl]-2-hydroxy-2-methyl-1-propane-1-on, obviates the need of displaying a pictogram indicating hazard and no or little smell is produced during curing and remains in a cured matter immediately after curing.

However, since b1 is not or little soluble in the monomers mentioned above, the amount thereof to be mixed is limiting. For this reason, the amount is kept around 7% by weight or less to stably maintain a uniform dissolved state without precipitation depending on the kind of monomer.

In the present disclosure, the combinational use of b1, b2, and b3 makes it possible to keep the content of b2 less than 2.5% by weight and b3 less than 3% by weight, have compatibility between safety and curing property, and furthermore prevent production of smell.

The polymerization initiator for use in the photopolymerizable composition of the present disclosure is a photoradical polymerization initiator.

(Meth)acrylic acid esters and (meth)amide acrylates are known to be ion polymerizable. However, ion polymerization initiators are generally expensive and slightly produce strong acid and strong alkali even in a state where they are not exposed to light.

Therefore, when a photopolymerizable composition is used for inkjet ink, a special care is to be taken for the ink supply paths in a inkjet coating system to be durable to strong acid or strong alkali, which limits the selection of members to constitute the inkjet ink coating system.

In contrast, the ink of the present disclosure uses a photoradical polymerization initiator that is inexpensive and generates no strong acid or strong alkali. Therefore, it is possible to manufacture ink at low cost, and also have a wide selection range of members of an inkjet coating system.

The photopolymerizable composition of the present disclosure can use another photopolymerization initiator in combination with the photopolymerization initiators of b1, b2, and b3. The total content of these photopolymerization initiators is preferably from 6.5% by weight to 20% by weight to secure the minimum curing property.

Other Monomer Component

Specific examples of the other monomer components that can be used in combination with diethylene glycol dimethacrylate include, but are not limited to, a caprolactone-modified dipentaerythritol hexaacrylate, an ethyleneoxide-modified trimethylol propane trimethacrylate, and polypropylene glycol diacrylate.

In addition, curing property is boosted by adding a caprolactone-modified dipentaerythritol hexaacrylate and/or an ethyleneoxide-modified trimethylol propane trimethacrylate.

Diethylene glycol dimethacrylate is extremely hard when cured but its curing requires a large amount of energy because of its insufficient curability. For this reason, caprolactone-modified dipentaerythritol hexaacrylate and an ethyleneoxide-modified trimethylol propane trimethacrylate are added to boost the robustness of a formed layer without increasing the photoenergy for curing.

However, caprolactone-modified dipentaerythritol hexaacrylate and ethyleneoxide-modified trimethylol propane trimethacrylate are more viscous than diethylene glycol dimethacrylate.

For this reason, when assuming the use of the photopolymerizable composition of the present disclosure as inkjet ink, caprolactone-modified dipentaerythritol hexaacrylate and/or ethyleneoxide-modified trimethylol propane trimethacrylate preferably accounts for 10 parts by weight to 70 parts by weight when the total content of the monomer components is 100 parts by weight.

Considering that inkjet ink is ejected at 25° C., the ink preferably has a viscosity of from 2 mPa·s to 150 mPa·s at 25° C. and, more preferable, from 5 mPa·s to 18 mPa·s.

However, it is possible to use the temperature control feature of an ejection head. When the viscosity of ink is too high at 25° C., it is good to raise the temperature of the ejection head to around 45° C. to around 60° C. to make the ink less viscous.

Since a cured matter, i.e., formed layer, of a photopolymerizable composition containing caprolactone-modified dipentaerythritol hexaacrylate and/or ethyleneoxide-modified trimethylol propane trimethacrylate is sufficiently hard, it is excellent to protect the surface thereof but less flexible. For this reason, when an external force is applied to a formed layer during processing such as punch hole or cutting, problems occur such that the formed layer is cracked or chipped.

By adding polypropylene glycol diacrylate, a formed layer having excellent workability is obtained which is free from cracking thereof at the processed edge when the substrate of the formed layer is cut after layer forming while reducing the degradation of the robustness of the formed layer. In addition, it is also possible to prevent cracking or chipping of a formed layer during processing while demonstrating robustness at a particular level by application of a less amount of photoenergy.

When assuming the use of the photopolymerizable composition of the present disclosure as inkjet ink, the content of polypropylene glycol diacrylate is preferably accounts for 10 parts by weight to 70 parts by weight when the total content of the monomer components is 100 parts by weight.

With regard to monomers, most of known monomers have skin sensitization potential causing swelling, itch, a rash, etc. of skin by the contact thereof but caprolactone-modified dipentaerythritol hexaacrylate, ethyleneoxide-modified trimethylol propane trimethacrylate, and polypropylene glycol diacrylate have negative response about skin sensitization potential, meaning that they are harmless and excellent about safety.

Moreover, although it is preferable to use a monomer having a negative response in skin sensitization potential, the following (meth)acrylates and (meth)acryl amides, which may cause a skin problem in some degrees when used alone or are not confirmed of their skin sensitization potential, can be used together if care is taken for safety depending on particular applications.

Specific examples thereof include, but are not limited to, ethylene glycol di(meth)acrylate, hydroxy pivalic acid neopentyl glycol di(meth)acrylate, γ-butylolactone acrylate, isobornyl (meth)acrylate, formalized trimethylol propane mono(meth)acrylate, polytetramethylene glycol di(meth)acrylate, trimethylol propane (meth)acrylic acid salicylic acid ester, diethylene glycol di(meth)acrylate, triethylene glycol di(meth)acrylate, tetraethylene glycol di(meth)acrylate, polyethylene glycol di(meth)acrylate [($CH_2$=CH—CO—($OC_2H_4$)n-OCOCH=$CH_2$ (n≈4)], polyethylene glycol di(meth)acrylate [($CH_2$=CH—CO—($OC_2H_4$)n-OCOCH=$CH_2$ (n≈9)], polyethylene glycol di(meth)acrylate [($CH_2$=CH—CO—($OC_2H_4$)n-OCOCH=$CH_2$ (n≈14)], polyethylene glycol di(meth)acrylate [($CH_2$=CH—CO—($OC_2H_4$)n-OCOCH=$CH_2$ (n≈23)], dipropylene glycol di(meth)acrylate, tripropylene glycol di(meth)acrylate, polypropylene glycol dimethacrylate [($CH_2$=C($CH_3$)—CO—($OC_3H_6$)n-OCOC($CH_3$)=$CH_2$ (n≈7)], 1,3-butane diol di(meth)acrylate, 1,4-butane diol di(meth)acrylate, 1,6-hexane diol di(meth)acrylate, 1,9-nonene diol di(meth)acrylate, neopentyl glycol di(meth)acrylate, tricyclodecane dimethanol di(meth)acrylate, propylene oxide-modified bisphenol A di(meth)acrylate, 1,6-hexane dioldi(meth)acrylate, polyethylene glycol di(meth)acrylate, dipenta erythritol hexa(meth)acrylate, methacryloyl morphorine, 2-hydroxypropyl (meth)acryl amide, propylene oxide-modified tetramethylol methane tetramethacrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanulate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinylcaprolactam, N-vinyl pyrrolidone, N-vinyl formamide, polyurethane di(meth)acrylate, polyurethanetri(meth)acrylate, polyurethane tetra(meth)acrylate, polyurethane penta(meth)acrylate, and polyurethane poly(meth)acrylate.

The content of diethylene glycol dimethacrylate is 25% by weight or more when other monomer components are added.

Coloring Agent (Colorant)

The photopolymerizable composition may contain no colorant to be transparent or optionally contain a colorant. When the photopolymerizable composition is desired to be colorless or white, it is preferable to use less colored materials except for the polymerization initiator and the colorant described later.

Known inorganic pigments and organic pigments can be used as colorant to color the photopolymerizable composition.

Carbon black manufactured by a furnace method or a channel method can be used as black pigment.

Pigment Yellow-based pigments can be used as yellow pigments. Specific examples thereof include, but are not limited to, Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Pigment Red-based pigments can be used as magenta pigments. Specific examples thereof include, but are not limited to, Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Pigment Blue-based pigments can be used as cyan pigments. Specific examples thereof include, but are not limited to, Pigment Blue 1, Pigment Blue 2, Pigment Blue 3, Pigment Blue 15, Pigment Blue 15:3, Pigment Blue 15:4. Pigment Blue 16, Pigment Blue 22, Pigment Blue 60, Pat Blue 4, and Pat Blue 60.

Specific examples of white pigments or colorless fillers to reform physical properties include, but are not limited to, sulfates of alkaline earth metals such as barium sulfide, carbonates of alkaline earth metals such as calcium carbonates, silicas such as fine powder of silicic acid and synthetic silicate, calcium silicate, alumina, hydrated alumina, titanium oxide, zinc oxide, talc, and clay.

Considering properties, other inorganic pigments and organic pigments can be optionally used.

These pigments can be dispersed by a pigment dispersing polymer having a polar group.

Other Materials

The photopolymerizable composition of the present disclosure optionally contains a polymerization inhibitor, a surfactant, etc.

Specific examples of the polymerization initiators include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butyl diphenylamine, 9,10-di-n-butoxyanthracene, and 4,4'-[1,10-dioxo-1,10-decandiylbis(oxy)]bis[2,2,6,6-tetramethyl]-1-piperidinyloxy).

Specific examples of the surfactants include, but are not limited to, higher aliphatic acid esters having a polyether, an amino group, a carboxylic group, or a hydroxyl group, polydimethyl siloxane compounds having a polyether, an amino group, a carboxylic group, or a hydroxyl group at its end or side chain, and fluoroalkyl compounds having a polyether, an amino group, a carboxylic group, or a hydroxyl group.

Inkjet Ink

The photopolymerizable composition of the present disclosure can be used as inkjet ink. Such inkjet can be accommodated in a container, which can be used as ink cartridge. Due to such an ink cartridge, there is no need to directly touch ink during operations such as ink change, which makes users free from concerns of contamination on fingers and clothes and also prevents foreign objects such as dust from mingling into the ink.

There is no specific limit to the container. Any form, any structure, any size, and any material can be suitably selected to a particular application. For example, a container having an ink bag formed of aluminum laminate film, a resin film, etc. is suitable.

Figure 1:
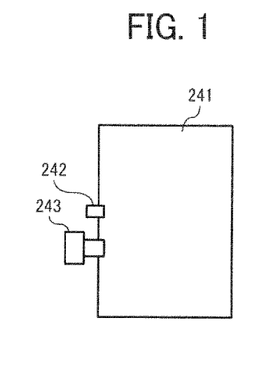
FIG. 1 is a schematic diagram illustrating an example of the ink bag of an ink cartridge according to an embodiment of the present disclosure.
Figure 2:
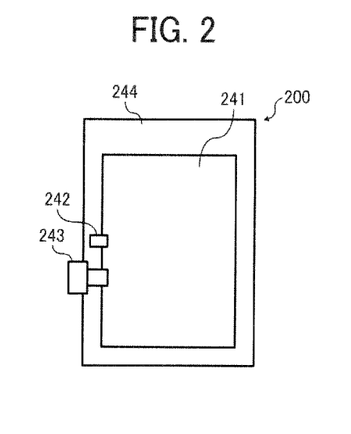
FIG. 2 is a schematic diagram illustrating an example of the ink cartridge according to an embodiment of the present disclosure in which the ink bag of FIG. 1 is accommodated.

Next, the ink cartridge is described in detail with reference to FIGS. 1 and 2. FIG. 1 is a schematic diagram illustrating an example of an ink bag 241 of an ink cartridge. FIG. 2 is a schematic diagram illustrating an ink cartridge 200 that accommodates the ink bag of FIG. 1 in an cartridge housing 244.

As illustrated in FIG. 1, after the ink bag 241 is filled with ink through an ink inlet 242 and the air remaining in the ink bag 241 is discharged, the ink inlet 242 is closed by fusion.

At the time of use, a needle in the inkjet recording device is pierced into an ink outlet 243 made of a rubber member to allow ink supply to the inkjet recording device. The ink bag 241 is made of a packaging material such as aluminum laminate film having no air permeability. The inkbag 241 is accommodated in a cartridge housing 244 made of plastic as illustrated in FIG. 2, which is detachably attachable to a various type of inkjet recording device as the ink cartridge 200.

It is preferable that the ink cartridge of the present disclosure is detachably attachable to inkjet recording devices. By using such an ink cartridge, replenishing and exchanging ink is simplified, thereby improving the workability.

As for a coating base for the ink of the present invention, paper, plastic, metal, ceramic, glass, or a composite material thereof is used. Since an absorbent base, such as wood free paper, can expect an effect of penetrating and drying, it is practical to use an aqueous ink or an oil ink, which is not a quick-drying ink, for such base. On the other hand, it is practical to use a quick-drying ink for a non-absorbent base, such as gloss coat paper, a plastic film, a plastic molded article, ceramic, glass, and metal.

The ink of the present disclosure is preferably used on, but is not limited to, non-absorbent recording media which are immediately cured upon application of light. Of such non-absorbent recording media, the ink of the present disclosure is suitably used for plastic films or plastic molded articles formed of polyethylene, polypropylene, polyethylene terephthalate, polycarbonate, an ABS resin, polyvinyl chloride, polystyrene, any other polyesters, polyamide, a vinyl-based material, or a composite material thereof.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

Evaluation Method of SI Value

According to the skin sensitization test based on the LLNA (Local Lymph Node Assay) method, the SI value was measured in the manner described below.

Test Material

Positive Control Substance

α-hexylcinnamaldehyde (HCA; product of Wako Pure Chemical Industries, Ltd.) was used as positive control material.

Medium

As a medium, a mixture containing acetone (product of Wako Pure Chemical Industries, Ltd.) and olive oil (product of Fudimi Pharmaceutical Co., Ltd.) in a volume ratio of 4 to 1 was used.

Animals Used

Before treated with the test substances, the positive control or the medium control, female mice were acclimated for 8 days including 6-day quarantine. No abnormalities were found in all the mice (used animals) during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.

Housing Environment

Throughout the housing period including the quarantine/acclimation period, the used animals were housed in an animal room with barrier system, which was set as follows: 21° C. to 25° C. in temperature, 40% to 70% in relative humidity, 10 times/hour to 15 times/hour in frequency of air circulation, and a 12 hour-interval lighting cycle (lighting from 7:00 to 19:00).

The housing cages used were those made of polycarbonate, and four animals were housed in each cage. The used animals were given ad libitum solid feed for laboratory animals MF (product of Oriental Yeast Co., Ltd.).

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

Test Method

Group Composition

The group compositions of the medium control group and positive control group used for the measurement of the SI value are shown in Table 1.

TABLE 1

| Test group | Skin sensitizing material | Amount of skin sensitization (µL/auricular lymph) | Number of skin sensitizing | Number of animals (Animal number) |
|---|---|---|---|---|
| Vehicle control group | Medium only | 25 | Once/day × 3 days | 4 (1 to 4) |
| Positive control group | 25.0% HCA | 25 | Once/day × 3 days | 4 (5 to 8) |

Preparation

Test Substance

Table 2 shows the amount of the test substance.

The test substance was weighed in a measuring flask, and the volume of the test substance was adjusted to 1 mL with the medium. The thus-prepared test substance preparation was placed in a light-shielded airtight container (made of glass).

TABLE 2

|  | Adjustment concentration (W/v %) | Test substance weight (g) |
|---|---|---|
| Test substance | 50.0 | 0.5 |

Positive Control Substance

About 0.25 g of HCA was accurately weighed, and the medium was added to the HCA to have the volume of 1 mL, to thereby prepare a 25.0% by mass solution. The thus-prepared positive control substance preparation was placed in a light-shielded airtight container (made of glass).

BrdU 200 mg of 5-bromo-2'-deoxyuridine (BrdU, product of NACALAI TESQUE, INC.) was accurately weighed in a measuring flask. Thereafter, physiological saline (product of OTSUKA PHARMACEUTICAL CO., LTD.) was added into the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

Preparation Day and Storage Period

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

Sensitization and Administration of BrdU

Sensitization

Each (25 µL) of the test substance preparations, the positive control preparation or the medium was applied to both the auricles of each of the used animals using a micropipetter.

This treatment was performed once a day for three consecutive days.

Administration of BrdU

About 48 hours after the final sensitization, the BrdU preparation (0.5 mL) was intraperitoneally administered once to each of the used animals.

Observation and Examination

General Conditions

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

Measurement of Body Weights

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

Removal of Auricular Lymph Node and Measurement of Weight Thereof

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

Measurement of BrdU Intake

After returning the auricular lymph nodes to room temperature, the auricular lymph nodes were mashed with the gradual addition of physiological saline, and suspended therein.

The thus-obtained suspension was filtrated and thereafter dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

Evaluation of Results

Calculation of Stimulation Index (SI)

As shown in the following formula, the measurement of BrdU intake for each individual was divided by the average of the measurements of BrdU intake in the vehicle control group to calculate the SI value for the individual. The SI value of each test group was the average of the SI values of the individuals. Notably, the SI value was rounded at the second decimal place and shown to the first decimal place.

SI=Average (average of 3 well) of BrdU measuring values of individuals/Average (average of 4 well) of BrdU measuring values of 4 animals) of BrdU measuring values of vehicle control group     Relation 1

Adjustment of Photopolymerizable Composition

Hazard of the materials for use in Examples and Comparative Examples are shown in Table 3.

TABLE 3

| | | | | GHS hazard pictogram | | |
| --- | --- | --- | --- | --- | --- | --- |
| | | | | Skin sensitization | Aquatic toxicity | Reproductive |
| Monomer (a) | a1 | Diethylene glycol dimethacrylate (1.1) "2G" from Shin-Nakamura Chemical Co., Ltd. | | Negative | Negative | Negative |
| | a2 | caprolactone-modified dipentaerythritol hexaacrylate (Negative in Evaluation by MSDS) "DPCA 60" from Nippon Kayaku Co., Ltd. | | Negative | Negative | Negative |
| | a3 | Ethyleneoxide-modified trimethylol propane trimethacrylate (1.0) "TMPT-3EO" from Shin-Nakamura Chemical Co., Ltd. | | Negative | Negative | Negative |
| | a4 | Polypropylene glycol diacrylate (1.5) "M-270", from Toagosei Company, Limited | | Negative | Negative | Negative |
| | a5 | Diethylene glycol diacrylate "FA-222A" from Hitachi Chemical Co., Ltd. Required to display "R43" indicating positive in skin sensitization in European Directives (67/548/EEC) | | Positive | Negative | Negative |
| Photo-polymerization initiator (b) | b1 | 1-[4-(2-hydroxyethoxy)-phenyl]-2-hydroxy-2-methyl-1-propane-1-on Negative in MSDS evaluation Irgacure 2959, from BASF | | Negative | Negative | Negative |
| | b2 | 2-hydroxy-1-(4-[4-(2-hydroxy-2-methyl-propionyl)benzyl]phenyl]-2-methyl-1-propane-1-on Negative in MSDS evaluation Irqacure 127, from BASF | | Negative | Positive | Negative |

TABLE 3-continued

|  |  | GHS hazard pictogram | | |
|---|---|---|---|---|
|  |  | Skin sensitization | Aquatic toxicity | Reproductive |
| b3 | Oligo{2-hydroxy-2-methyl-1-[4-(1-methylvinyl)phenyl]propanone} Negative in MSDS evaluation ESACUREONE, from Lamberti | Negative | Negative | Positive |
| b4 | 1-hydroxycyclohexyl phenyl ketone (Negative in MSDS evaluation) Irgacure 184, from BASF | Negative | Negative | Negative |

Values in parentheses at the ends of the materials shown in Table 3 are SI values in (1) LLNA test, and "None" means "negative for skin sensitization potential" or "no skin sensitization potential" in (2) MSDS (Material Safety Data Sheet).

The materials with no value is already required to display the risk phrase indicating skin sensitization potential by European Directives (67/548/EEC). Therefore, there was need to conduct the test.

Adjustment of Compositions of Examples 1 to 14 and Comparative Examples 1 to 10

The materials were mixed in the ratio shown in each cell of Examples and Comparative Examples in Tables 4 to 7 to obtain inks. The values are represented in part by weight but the mixing ratios in % by weight are also shown in parentheses.

TABLE 4

| Material | | Ex. 1 | Ex. 2 | Ex. 3 | Ex. 4 | Ex. 5 | Ex. 6 | Ex. 7 |
|---|---|---|---|---|---|---|---|---|
| Monomer | a1 | 100 | 100 | 90 | 50 | 50 | 30 | 70 |
|  | a2 |  |  | 10 | 50 |  |  | 10 |
|  | a3 |  |  |  |  | 50 | 70 | 20 |
|  | a4 |  |  |  |  |  |  |  |
|  | a5 |  |  |  |  |  |  |  |
| Photo-Polymerization initiator | b1 | 5 (4.5%) | 7 (6.2%) | 5 (4.5%) | 5 (4.5%) | 5 (4.5%) | 5 (4.5%) | 5 (4.5%) |
|  | b2 | 2.5 (2.3%) | 2.7 (2.4%) | 2.5 (2.3%) | 2.5 (2.3%) | 2.5 (2.3%) | 2.5 (2.3%) | 2.5 (2.3%) |
|  | b3 | 3 (2.7%) | 3.3 (2.9%) | 3 (2.7%) | 3 (2.7%) | 3 (2.7%) | 3 (2.7%) | 3 (2.7%) |
|  | b4 |  |  |  |  |  |  |  |
| Carbon black *1 |  |  |  |  |  |  |  |  |

TABLE 5

| Material | | Ex. 8 | Ex. 9 | Ex. 10 | Ex. 11 | Ex. 12 | Ex. 13 | Ex. 14 |
|---|---|---|---|---|---|---|---|---|
| Monomer | a1 | 70 | 70 | 60 | 40 | 60 | 50 | 30 |
|  | a2 | 10 | 10 | 10 | 10 | 10 |  |  |
|  | a3 | 20 | 20 | 20 | 20 | 20 |  |  |
|  | a4 |  |  | 10 | 30 | 10 | 50 | 70 |
|  | a5 |  |  |  |  |  |  |  |
| Photo-Polymerization initiator | b1 | 5.6 (5.0%) | 2.5 (2.3%) | 5 (4.5%) | 5 (4.5%) | 5 (4.5%) | 5 (4.5%) | 5 (4.5%) |
|  | b2 | 2.7 (2.4%) | 2 (1.9%) | 2.5 (2.3%) | 2.5 (2.3%) | 2.5 (2.3%) | 2.5 (2.3%) | 2.5 (2.3%) |
|  | b3 | 3.2 (2.9%) | 2.5 (2.3%) | 3 (2.7%) | 3 (2.7%) | 3 (2.7%) | 3 (2.7%) | 3 (2.7%) |
|  | b4 |  |  |  |  |  |  |  |
| Carbon black *1 |  |  |  |  |  | 0.2 |  |  |

TABLE 6

| Material | | Comp. Ex. 1 | Comp. Ex. 2 | Comp. Ex. 3 | Comp. Ex. 4 | Comp. Ex. 5 | Comp. Ex. 6 | Comp Ex. 7 |
|---|---|---|---|---|---|---|---|---|
| Monomer | a1 |  | 100 | 100 | 100 | 100 | 100 |  |
|  | a2 |  |  |  |  |  |  |  |
|  | a3 |  |  |  |  |  |  |  |
|  | a4 |  |  |  |  |  |  |  |
|  | a5 | 100 |  |  |  |  |  | 100 |

TABLE 6-continued

| Material | | Comp. Ex. 1 | Comp. Ex. 2 | Comp. Ex. 3 | Comp. Ex. 4 | Comp. Ex. 5 | Comp. Ex. 6 | Comp Ex. 7 |
|---|---|---|---|---|---|---|---|---|
| Photo-Polymerization initiator | b1 | 5 (4.8%) | 5 (4.8%) | 10.5 (9.5%) | | | | |
| | b2 | | | | 10.5 (9.5%) | | | 2.5 (2.4%) |
| | b3 | | | | | 10.5 (9.5%) | | 3.1 (2.9%) |
| | b4 | | | | | | 10.5 (9.5%) | |
| Carbon black *1 | | | | | | | | |

TABLE 7

| Material | | Comp. Ex. 8 | Comp. Ex. 9 | Comp. Ex. 10 | Comp. Ex. 11 |
|---|---|---|---|---|---|
| Monomer | a1 | 100 | 100 | 100 | 100 |
| | a2 | | | | |
| | a3 | | | | |
| | a4 | | | | |
| | a5 | | | | |
| Photo-polymerization initiator | b1 | | | 8.0 (7.2%) | 8.0 (7.2%) |
| | b2 | 2.5 (2.4%) | 5.5 (5.0%) | 2.6 (2.4%) | |
| | b3 | 3.1 (2.9%) | 5 (4.5%) | | 2.6 (2.4%) |
| | b4 | | | | |
| Carbon black *1 | | | | | |

*1: Carbon black "#10" (manufactured by Mitsubishi Chemical Corporation) was mixed with "Solsperse 32000 (manufactured by Lubrizol Japan Ltd. in such a manner that the weight ratio was 3:1.

The viscosity at 25° C., 45° C., and 60° C., the robustness of the formed layers, and the solubility of each ink shown in Tables 4 to 7 were measured according to the following method. The evaluation results are shown in Tables 8 to 11.

Evaluation on Viscosity

The viscosity was measured by a cone plate-type rotary viscometer (manufactured by TOKI SANGYO CO., LTD.) with the temperature of circulating water being constantly set to 25° C., 45° C., and 60° C.

The temperature of 25° C. was set assuming typical room temperature. The temperatures of 45° C. and 60° C. were set taking into account the specification of a marketed heatable inkjet ejection head such as GEN4 from Ricoh Printing Systems, Ltd.

Evaluation on Robustness of Formed Layer

To evaluate the robustness of a formed layers by brush application, the photopolymerizable compositions adjusted at particular mixing ratios were used as they were.

In addition, to make an evaluation of inkjet ink, ink was accommodated in an aluminum pouch bag illustrated in FIG. 1 in order to prevent air bubbles from entering thereinto after the ink was filtrated by a fluorine-containing resin membrane filter having a hole diameter of 5 µm. Thereafter, the pouch bag was mounted onto a plastic cartridge illustrated in FIG. 2 and the cartridge was accommodated in a chassis where ink flow paths were set to guide the ink to GEN4 head (manufactured by Ricoh Industry Company, Ltd.). The inkjet ink was ejected from the head to form a solid layer.

In both brush application and inkjet printing, the thickness of the formed layers was adjusted to be about 40 µm.

A solid coated film, which was formed on a marketed polyethyleneterephthalate film (A4300 having a thickness of 188 microns from Toyobo Co., Ltd.), was thereafter cured by a high-pressure mercury vapor lamp under the conditions of: wavelength range corresponding to UVA range of from 320 nm to 390 nm; irradiation of 0.3 W/cm$^2$ and light amount of 1.2 J/cm$^2$ to 5.0 J/cm$^2$ to evaluate the robustness and the workability of the cured layer.

Scratch resistance according to a pencil method specified in JIS-K-5600-5-4 was used to evaluate the robustness of irradiated and cured solid layer. Pencil hardness includes 2H, H, F, HB, B, 2B to 6B in descending order of hardness.

With regard to workability, a document file hole puncher (LION PUNCH No. 150, manufactured by LION CORPORATION) was used to make a punch hole in the solid layer. The solid layer was visually confirmed whether a punch hole was made therein. A solid layer having no cracking was evaluated as A and, cracking, B. The solid layer cured under the condition of 1.2 J/cm$^2$ was used for evaluation. However, if the pencil hardness of a solid layer was less than 6B, meaning insufficient curing property, a solid layer cured under the condition of 5.0 J/cm$^2$ was used.

Evaluation on Solubility

Since solubility is in proportion to temperatures, to improve the efficiency of the operation of preparing a composition, the materials thereof were heated and stirred to be dissolved uniformly. Thereafter, assuming transportation or temporary storage of a composition in winter, the composition was visually confirmed after being preserved still at −20° C. for one week. A composition that was clear and uniformly dissolved was evaluated as no problem about solubility. By contrast, a composition that was cloudy was evaluated as problematic about solubility. As a matter of course, the composition has to be uniformly dissolved to secure the uniformity of a cured matter.

TABLE 8

| | Ex. 1 | Ex. 2 | Ex. 3 | Ex. 4 | Ex. 5 | Ex. 6 | Ex. 7 |
|---|---|---|---|---|---|---|---|
| Viscosity at 25° C. | 8 | 9 | 10 | 60 | 18 | 28 | 15 |
| Viscosity at 45° C. | *2 | *2 | *2 | 22 | 10 | 16 | 8 |
| Viscosity at 60° C. | *2 | *2 | *2 | 14 | *2 | 6 | *2 |
| Solubility | Uniformly dissolved | Uniformly dissolved | Uniformly dissolved | Uniformly dissolved | Uniformly dissolved | Uniformly dissolved | Uniformly dissolved |
| GHS hazard pictogram as composition (related to skin sensitization, | None | None | None | None | None | None | None |

TABLE 8-continued

|  | | Ex. 1 | Ex. 2 | Ex. 3 | Ex. 4 | Ex. 5 | Ex. 6 | Ex. 7 |
|---|---|---|---|---|---|---|---|---|
| | aquatic toxicity, reproductive toxicity) | | | | | | | |
| Inkjet printing | Temp. set at ejection head | 25° C. | 25° C. | 25° C. | 60° C. | 45° C. | 60° C. | 45° C. |
| | Smell (during curing, remaining in cured matter | Faint | Faint | Faint | Faint | Faint | Faint | Faint |
| | Robustness of formed layer (1.2 J/cm$^2$) | Less than 6B | 6B | 5B | 2H | F | H | H |
| | Robustness of formed layer (5.0 J/cm$^2$) | 5B | 4B | 2B | 2H | H | H | H |
| | Workability | Good | Good | Good | Bad | Bad | Bad | Bad |
| Brushing | Smell (during curing, remaining in cured matter | Faint | Faint | Faint | Faint | Faint | Faint | Faint |
| | Robustness of formed layer (1.2 J/cm$^2$) | Less than 6 B | 6B | 5B | 2H | F | H | H |
| | Robustness of formed layer (5.0 J/cm$^2$) | 5B | 4B | 2B | 2H | H | H | H |
| | Workability | Good | Good | Good | Bad | Bad | Bad | Bad |

TABLE 9

|  | | Ex. 8 | Ex. 9 | Ex. 10 | Ex. 11 | Ex. 12 | Ex. 13 | Ex. 14 |
|---|---|---|---|---|---|---|---|---|
| Viscosity at 25° C. | | 16 | 14 | 29 | 33 | 29 | 27 | 40 |
| Viscosity at 45° C. | | 8 | 8 | 16 | 18 | 16 | 12 | 16 |
| Viscosity at 60° C. | | *2 | *2 | 8 | 10 | 8 | *2 | 11 |
| Solubility | | Uniformly dissolved | Uniformly dissolved | Uniformly dissolved | Uniformly dissolved | Uniformly dissolved | Uniformly dissolved | Uniformly dissolved |
| GHS hazard pictogram as composition (related to skin sensitization, aquatic toxicity, reproductive toxicity) | | None | None | None | None | None | None | None |
| Inkjet printing | Temp. set at ejection head | 45° C. | 45° C. | 60° C. | 60° C. | 60° C. | 45° C. | 60° C. |
| | Smell (during curing, remaining in cured matter | Faint | Faint | Faint | Faint | Faint | Faint | Faint |
| | Robustness of formed layer (1.2 J/cm$^2$) | H | Less than 6B | F | HB | HB | B | 3B |

TABLE 9-continued

|  |  | Ex. 8 | Ex. 9 | Ex. 10 | Ex. 11 | Ex. 12 | Ex. 13 | Ex. 14 |
|---|---|---|---|---|---|---|---|---|
| | Robustness of formed layer (5.0 J/cm$^2$) | 2H | 2B | H | F | H | HB | 2B |
| Brushing | Workability | Bad | Good | Good | Good | Good | Good | Good |
| | Smell (during curing, remaining in cured matter) | Faint | Faint | Faint | Faint | Faint | Faint | Faint |
| | Robustness of formed layer (1.2 J/cm$^2$) | H | Less than 6B | F | HB | HB | B | 3B |
| | Robustness of formed layer (5.0 J/cm$^2$) | 2H | 2B | H | F | H | HB | 2B |
| | Workability | Bad | Good | Good | Good | Good | Good | Good |

TABLE 10

| | Material | Comp. 1 | Comp. 2 | Comp. 3 | Comp. 4 | Comp. 5 | Comp. 6 | Comp 7 |
|---|---|---|---|---|---|---|---|---|
| | Viscosity at 25° C. | 7 | 7 | *3 | 8 | 8 | 8 | 7 |
| | Viscosity at 45° C. | *2 | *2 | *3 | *2 | *2 | *2 | *2 |
| | Viscosity at 60° C. | *2 | *2 | *3 | *2 | *2 | *2 | *2 |
| | Solubility | Uniformly dissolved | Uniformly dissolved | Cloudy | Uniformly dissolved | Uniformly dissolved | Uniformly dissolved | Uniformly dissolved |
| | GHS hazard pictogram as composition (related to skin sensitization, aquatic toxicity, reproductive toxicity) | Sin sensitization | None | None | Aquatic toxicity | Reproductive toxicity | None | Skin sensitization |
| Inkjet printing | Temp. set at ejection head | 25° C. | 25° C. | *3 | 25° C. | 25° C. | 25° C. | 25° C. |
| | Smell (during curing, remaining in cured matter) | Faint | Faint | *3 | Faint | Faint | Discomfortable | Faint |
| | Robustness of formed layer (1.2 J/cm$^2$) | F | Less than 6B | *3 | Less than 6B | Less than 6B | Less than 6B | F |
| | Robustness of formed layer (5.0 J/cm$^2$) | H | Less than 6B | *3 | 4B | 6B | 5B | H |
| | Workability | Bad | Unable to evaluate due to shortage of curing | *3 | Good | Good | Good | Bad |
| Brushing | Smell (during curing, remaining in cured matter) | Faint | Faint | *3 | Faint | Faint | Discomfortable | Faint |

TABLE 10-continued

| Matarial | Comp. 1 | Comp. 2 | Comp. 3 | Comp. 4 | Comp. 5 | Comp. 6 | Comp 7 |
|---|---|---|---|---|---|---|---|
| Robustness of formed layer (1.2 J/cm²) | F | Less than 6B | *3 | Less than 6B | Less than 6B | Less than 6B | F |
| Robustness of formed layer (5.0 J/cm²) | H | Less than 6B | *3 | 4B | 6B | 5B | H |
| Workability | Bad | Unable to evaluate due to shortage of curing | *3 | Good | Good | Good | Bad |

TABLE 11

| Material | | Com. Ex. 8 | Comp. Ex. 9 | Comp. Ex. 10 | Camp. Ex. 11 |
|---|---|---|---|---|---|
| Viscosity at 25° C. | | 7 | 9 | 9 | 9 |
| Viscosity at 45° C. | | *2 | *2 | *3 | *2 |
| Viscosity at 60° C. | | *2 | *2 | *3 | *2 |
| Solubility | | Uniformly dissolved | Uniformly dissolved | Cloudy | Cloudy |
| GHS hazard pictogram as composition (related to skin sensitization, aquatic toxicity, reproductive toxicity) | | | Aquatic toxicity Reproductive toxicity | None | None |
| Inkjet printing | Temp. set at ejection head | 25° C. | 25° C. | *3 | *3 |
| | Smell (during curing, remaining in cured matter | Faint | Faint | *3 | *3 |
| | Robustness of formed layer (1.2 J/cm²) | Less than 6B | Less than 6B | *3 | *3 |
| | Robustness of formed layer (5.0 J/cm²) | Less than 6B | 5B | *3 | *3 |
| | Workability | Unable to evaluate due to shortage of curing | Good | *3 | *3 |
| Brushing | Smell (during curing, remaining in cured matter | Faint | Faint | *3 | *3 |
| | Robustness of formed layer (1.2 J/cm²) | Less than 6B | Less than 6B | *3 | *3 |
| | Robustness of formed layer (5.0 J/cm²) | Less than 6B | 5B | *3 | *3 |
| | Workability | Unable to evaluate due to shortage of curing | Good | *3 | *3 |

*2: Viscosity was not measured because inkjet ejection was possible at temperatures lower than the set temperature.
*3: Evaluation was aborted because the composition was not uniformly dissolved.

As seen in Comparative Examples 1 and 7, by using a monomer causing skin problems, it is possible to obtain a product having faint smell during curing or remaining in a formed layer and having no problem about aquatic toxicity or reproductive toxicity. However, first, it is not preferable to use a monomer causing skin problems.

As seen in Comparative Examples 2 and 8, by using diethylene glycol dimethacrylate as monomer which causes no skin trouble, has sufficiently low viscosity, and property thereof is not satisfactory.

To improve curing property, it is good to increase the amount of an initiator. However, as seen in Comparative Examples 3 to 6 and 9 to 11, simply increasing the amount or changing the kind of an initiator or using two or more kinds of initiators just causes problems about solubility, safety, and smell.

That is, as seen in Comparative Examples 2 to 6 and 8 to 11, if using just one or two of b1 (1-[4-(2-hydroxyethoxy)-phenyl]-2-hydroxy-2-methyl-1-propane-1-on), b2 (2-hydroxy-1-{4-[4-(2-hydroxy-2-methyl-propionyl)benzyl]phenyl}-2-methyl-1-propane-1-on), and b3 (oligo{2-hydroxy-2-methyl-1-[4-(1-methylvinyl)phenyl]propanone}) in combination with diethylene glycol dimethacrylate as monomer causing no trouble with skin, one of the problems about solubility, safety, and curing property is still unsolved.

If all the three kinds of initiators in combination is used and, for example, b1 ((1-[4-(2-hydroxyethoxy)-phenyl]-2-hydroxy-2-methyl-1-propane-1-on) is added to the composition of Comparative Example 9, aquatic toxicity and reproductive toxicity are not improved because it contains b2 (2-hydroxy-1-{4-[4-(2-hydroxy-2-methy-propionyl)benzyl]phenyl}-2-methyl-1-propane-1-on) and b3 (oligo{2-hydroxy-2-methyl-1-[4-(1-methylvinyl)phenyl]propanone}) excessively. This is obvious and not particularly exemplified.

However, as seen in Example 1, when the three kinds of initiators were used and the amount of b2 (2-hydroxy-1-{4-[4-(2-hydroxy-2-methyl-propionyl)benzyl]phenyl}-2-methyl-1-propane-1-on) is limited to less than 2.5% by weight and the amount of b3 (oligo{2-hydroxy-2-methyl-1-[4-(1-methylvinyl)phenyl]propanone}) is limited to less than 3.0% by weight, a photopolymerizable composition is obtained which has no problem with solubility, smell produced during curing and remaining in a formed layer, and safety such as skin sensitization, aquatic toxicity, and aquatic toxicity while it demonstrates a curing property at a particular level.

As seen in Example 2, by increasing the amount of the initiators in a range compatible with solubility and safety, curability is improved.

As seen in Examples 3 to 7, a harder cured matter can be obtained by a less application amount of photoenergy by adding a caprolactone-modified dipentaerythritol hexaacrylate and an ethyleneoxide-modified trimethylol propane trimethacrylate.

For example, as seen in Examples 4 and 5, in comparison of the cases where the monomers are mixed with an equal ratio, the cured matter is harder when caprolactone-modified dipentaerythritol hexaacrylate was used but the viscosity thereof was significantly increased. To the contrary, when ethyleneoxide-modified trimethylolpropanetrimethacrylate is used, the increase of viscosity is limited.

In addition, when both were used simultaneously, it is possible to make the increase of viscosity and improvement of the robustness of a formed layer compatible. Viscosity and the robustness of a formed layer can be adjusted by the kind and amount of monomers used, so that it is possible to suitably make an optimization to specifications required from system designing assuming inkjet ejection or requisitions from the purpose of a cured matter and cost.

As seen in Examples 8 and 9, the robustness of a formed layer can be adjusted by adjusting the mixing amount of the initiators in an allowable range in terms of solubility and safety, so that optimization can be made depending on a particular application as described above.

As seen in Examples 10, 11, 13, and 14, by using polypropylene glycol diacrylate as monomer, workability can be improved while the robustness of a formed layer can be improved by a less amount of photoenergy.

As seen in comparison between Examples 10 and 12, it is possible to obtain a photopolymerizable compound free from problems with solubility, smell produced during curing and remaining in a formed layer, and safety such as skin sensitization, aquatic toxicity, and aquatic toxicity while it demonstrates a curing property at a particular level even when a colorant is added.

Ethylene oxide-modified trimethylol propane trimethacrylate is represented by the chemical formula: $[CH_3CH_2C-\{CH_2(O-CH_2CH_2)x\text{-}OCOC(CH_3)=CH_2\}_3]$. As x, which represents the length of ethylene oxide portion, increases, the molecular weight increases, thereby increasing viscosity. For this reason, it becomes not suitable as the material for inkjet ink.

Trimethylol propane trimethacrylate where x is 0 is rated as N in the classification of EU. Directive 67/548/EEC, which indicates environment risk and hazard. In addition, the risk phrase of R51/53 indicating chronic aquatic toxicity and adverse impact for a long period of time is additionally stated for this trimethylol propane trimethacrylate. Conclusively, it is preferable to avoid using this compound if taking into account an impact on the environment.

In ethyleneoxide-modified trimethylolpropanetrimethacrylate for use in Examples, x was 1. When x is 1, there is no problem about viscosity as raw material to be mixed in inkjet ink. A photopolymerizable composition formed by mixing with this raw material forms a layer having a sufficient robustness, is free from skin sensitization, and is not classified as material having environment hazard, aquatic toxicity, and no adverse impact for a long period of time.

For this reason, ethylene oxide-modified trimethylol propane trimethacrylate having an x of 1 is particularly preferable in terms that it has a low viscosity. Ethylene oxide-modified trimethylol propane trimethacrylate having an x of 2 or more can be used, if desired.

In addition, in all of Examples and Comparative Examples, there was no significant difference of layer forming properties between inkjet printing and brush application. Moreover, all of the photopolymerizable composition and ink had faint smell (odor) and did not require any special care.

According to the present disclosure, a photopolymerizable composition is provided which reduces production of smell during curing and has excellent curability and safety.

Having now fully described embodiments of the present invention, it will be apparent to one of ordinary skill in the art that many changes and modifications can be made thereto without departing from the spirit and scope of embodiments of the invention as set forth herein.

What is claimed is:
1. A photopolymerizable composition comprising:
diethylene glycol dimethacrylate;
b1, where b1 is 1-[4-(2-hydroxyethoxy)-phenyl]-2-hydroxy-2-methyl-1-propane-1-on;
b2, where b2 is 2-hydroxy-1-{4-[4-(2-hydroxy-2-methyl-propionyl)benzyl]phenyl}-2-methyl-1-propane-1-on; and
b3, where b3 is oligo {2-hydroxy-2-methyl-1-[4-(1-methylvinyl)phenyl]propanone},
wherein a content of diethylene glycol dimethacrylate is 25% by weight or more,
wherein a non-zero content of b2 is less than 2.5% by weight, and
wherein a non-zero content of b3 is less than 3% by weight.

2. The photopolymerizable composition according to claim 1, further comprising caprolactone-modified dipentaerythritol hexaacrylate.

3. The photopolymerizable composition according to claim 1, further comprising ethylene oxide-modified trimethylol propane trimethacrylate.

4. The photopolymerizable composition according to claim 1, further comprising polypropylene glycol diacrylate.

5. The photopolymerizable composition according to claim 1, wherein the content of b2 is not less than 1.9% by weight, and the content of b3 is not less than 2.3% by weight.

6. The photopolymerizable composition according to claim 1, wherein the photopolymerizable composition is an ink and further comprises one or more colorants and additives.

7. An inkjet ink comprising:
diethylene glycol dimethacrylate;
b1, where b1 is 1-[4-(2-hydroxyethoxy)-phenyl]-2-hydroxy-2-methyl-1-propane-1-on;
b2, where b2 is 2-hydroxy-1-{4-[4-(2-hydroxy-2-methylpropionyl)benzyl]phenyl}-2-methyl-1-propane-1-on; and
b3, where b3 is oligo{2-hydroxy-2-methyl-1-[4-(1-methylvinyl)phenyl]propanone},
wherein a content of diethylene glycol dimethacrylate is 25% by weight or more,
wherein a non-zero content of b2 is less than 2.5% by weight, and
wherein a non-zero content of b3 is less than 3% by weight.

8. A cartridge comprising:
a container to accommodate the inkjet ink of claim 7.

9. The inkjet ink according to claim 7, further comprising caprolactone-modified dipentaerythritol hexaacrylate.

10. The inkjet ink according to claim 7, further comprising ethylene oxide-modified trimethylol propane trimethacrylate.

11. The inkjet ink according to claim 7, further comprising polypropylene glycol diacrylate.

12. The inkjet ink according to claim 7, wherein the content of b2 is not less than 1.9% by weight, and the content of b3 is not less than 2.3% by weight.

* * * * *